United States Patent Office 3,520,039
Patented July 14, 1970

---

3,520,039
METHOD OF SEALING HIGH ALUMINA ARC TUBES
Albert W. Olson, Gloucester, and Paul Patry, Marblehead, Mass., assignors to Sylvania Electric Products Inc., a corporation of Delaware
Filed June 17, 1968, Ser. No. 737,459
Int. Cl. H01j 9/18, 9/00
U.S. Cl. 29—25.11                                   4 Claims

---

ABSTRACT OF THE DISCLOSURE

Endcaps of niobium are used to seal the ends of an alumina arc tube. To improve the bond between the endcap and the tube, the niobium endcaps are cleaned in hot hydrogen peroxide prior to sealing.

---

BACKGROUND OF THE INVENTION

Field of the invention

This invention relates to arc discharge devices and more particularly to the method of sealing alumina arc tubes used in such devices.

Description of the prior art

Arc discharge devices, such as high pressure mercury vapor lamps, commonly had arc tubes made of quartz. Since quartz is a vitreous material, the ends of the tube could be sealed simply by heating and fusing, as in conventional glass working processes, although much higher temperatures were required to seal quartz than glass.

In order to improve the efficiency of such lamps, arc tubes capable of operating at higher temperatures than quartz were developed. The maximum operating temperature of quartz arc tubes is generally only about 900 to 1000° C. At higher arc tube operating temperatures, say, about 1300 to 1400° C., it is possible to realize lamp efficiency gains of about 10 or 20 lumens per watt. A satisfactory arc tube material for use at these temperatures is alumina. However since alumina is not a vitreous material, that is, it has a defined melting point (2050° C.), glass sealing techniques could not be used to hermetically seal the ends of the arc tubes.

Consequently, other methods were developed to seal the ends of alumina arc tubes. One such method involved brazing a refractory metal disc to the ends of the tube. It was necessary for the coefficient of thermal expansion of the metal to satisfactorily match that of the alumina in order to prevent seal failures resulting from the high operating temperatures. Discs made of niobium or alloys thereof proved satisfactory for this purpose. However, in order to provide a seal that is reliable for the rated life of the lamp, the surface of the disc must be thoroughly clean at the time of brazing. Ordinary cleaning methods, such as solvent cleaning, caustic washing or acid pickling, were not completely satisfactory.

SUMMARY OF THE INVENTION

An arc tube manufactured in accordance with this invention has niobium or niobium alloy endcaps hermetically sealing the ends of a light-transmissive alumina tubular envelope. Within the envelope is an ionizable fill generally comprising iodine, mercury, an alkali and a light-emitting metal. A fill of this type is known to the art and is shown in U.S. Pat. 3,363,133, issued on Jan. 9, 1968 to Harris et al. entitled "Electric Discharge Device Having Polycrystalline Alumina End Caps."

Disposed at each end of the envelope are electrodes, usually made of tungsten. When an arc is struck between the electrodes, the arc tube gradually heats up to its operating temperature, about 1300 to 1500° C., at which temperature the device is an intense light source.

The niobium endcaps are thin-walled cylinders having a diameter at one end that provides a close fit around an end of the tubular envelope. A flat surface on the endcap serves as the actual sealing area between the endcap and the envelope. To effect a hermetic seal, a sealing layer usually comprising one or more washers of suitable metals such as zirconium, titanium and vanadium is interposed between the flat surface of the endcap and the end of the alumina envelope. The assembly is then heated in an inert atmosphere or vacuum to a temperature sufficiently high to melt the sealing layer and cause metal therefrom to alloy with the endcap and to bond the endcap to the envelope.

The endcap can have a centrally positioned aperture therein which provides the mounting means for the tungsten electrode mentioned above. One end of the electrode can be positioned in the aperture and fastened, such as by brazing, to the endcap. The aperture can also provide the means for exhausting and filling the envelope after the endcaps have been sealed to the ends thereof. For example, a hollow exhaust tube, usually made of the same metal as the endcap, is fastened, such as by brazing, to the endcap concentric with the aperture in order to provide a passageway from the exhaust tube, through the aperture and into the interior of the envelope. Of course, in such a case, the tungsten electrode must not completely seal the aperture when the electrode is fastened to the endcap.

When such exhaust tubes are used in the manufacture of arc tubes in accordance with this invention, usually only one is required at one end of the envelope. The other end can be completely sealed by brazing material. However, we prefer to mount an exhaust tube at each end of the envelope and seal one off prior to exhausting and filling of the envelope. The sealed-off portion of the exhaust tube provides a convenient means for subsequent connection of an external electrical supply to the finished lamp.

After the arc tube has been exhausted and filled through the open exhaust tube, the exhaust tube is sealed by pinching off a portion thereof. If sufficient pressure is used in pinching off the exhaust tube, the pinched ends are cold welded together yielding a hermetic seal. If desired, the sealed end of the exhaust tube may also be welded or brazed.

However, we have found that in the preparation of arc tubes according to this process, the niobium endcaps must be absolutely clean, at the time of sealing to the alumina arc tube, in order to provide a reliable seal that will not leak or fail during the rated life of the lamp. Any surface contamination or oxide on the surface of the niobium or niobium alloy endcap can result in a poor seal that can fail prematurely. We have discovered that when aqueous hydrogen peroxide is used to clean the endcaps prior to sealing, the surface cleanliness of the metal is markedly improved and more reliable seals are thereby effected. Preferably, the hydrogen peroxide is at a temperature of about 30° to 80° C. when applied to the endcaps, and the preferable cleaning procedure is to completely immerse the endcaps in hot 30% hydrogen peroxide for about 1 to 30 minutes. Below about 30° C., the cleaning process is too slow to be suitable for usual manufacturing processes. Above about 80° C., the action of the peroxide on the niobium is too rapid to permit satisfactory control of the amount of metal dissolved. In addition, $H_2O_2$ gas is evolved from the solution at an undesirably high rate at temperatures above about 80° C. After removal from the peroxide solution, the parts are rinsed in water, then in acetone and are oven dried. The endcaps may then be stored in air for several days or weeks until needed.

Preferably also, we clean the endcaps in a degreasing solvent, such as trichloroethylene, prior to the peroxide cleaning, in order to remove oil or grease deposits therefrom. Such deposits can occur during the manufacture of the endcaps, especially when they are drawn to the desired shape from flat stock, which process necessitates the use of drawing oils.

It is not completely understood how $H_2O_2$ cleans the niobium surface, and especially the oxides thereon, since $H_2O_2$ is a strong oxidizing agent, having a standard oxidation-reduction potential of $-1.77$ volts. The mechanism appears to differ from that of strong acids, which dissolve the metal being cleaned by the action of the hydrogen ion. It is believed that the niobium reacts with the $H_2O_2$ to form a soluble niobium peracid complex, and that this reaction effectively removes all traces of oxides from the surface of the niobium endcaps.

DESCRIPTION OF THE PREFERRED EMBODIMENT

Figure 1:
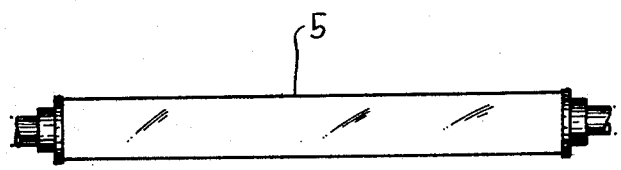
FIG. 1 is an elevational view of an alumina arc tube manufactured according to this invention.
Figure 2:
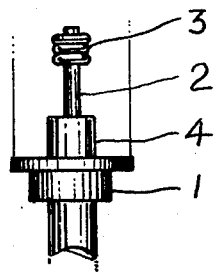
FIG. 2 is an expanded view of the endcap of such an arc tube, showing the tungsten electrode attached thereto.

Endcap 1, as shown in FIGS. 1 and 2, was deep drawn, in four successive drawing dies, from an 0.010 inch thick sheet of 99% niobium-1% zirconium. As drawn, endcap 1 was 5/16 inch long and had a tri-sectional cylindrical shape varying, in steps, from an outside diameter of 0.408 inch at the large end, to an intermediate diameter of 0.267 inch and a diameter of 0.148 inch at the small end. The three cylindrical sections were co-axial and had respective lengths, from the larger diameter section of 0.050 inch, 0.125 inch and 0.147 inch. Endcap 1 was then solvent cleaned in a commercial degreasing tank, employing trichloroethylene as the cleaning fluid.

An electrode assembly, comprising cylindrical base 4 fastened to one end of rod 2 and coil 3 fastened at the other end was connected to endcap 1 by inserting base 4 into the small diameter section of endcap 1 with rod 2 and coil 3 protruding beyond the large diameter section. Base 4 was then brazed to endcap 1. The electrode assembly was made of tungsten and base 4 was partially hollow with an aperture on the side thereof, to provide a passageway for exhausting and filling the arc tube as previously mentioned.

An exhaust tube, not shown, made of 99% niobium-1% zirconium and measuring 3 inches long by 0.125 inch diameter was inserted into the small diameter end of endcap 1 until it abutted the end of base 4 and was then brazed to endcap 1.

The endcap, with electrode and exhaust tube attached, was then cleaned by completely immersing in a 30% (by volume) aqueous solution of hydrogen peroxide. The solution was maintained at a temperature of 30° C., and the endcap was immersed for 30 minutes. After removal from the peroxide solution, the endcap was rinsed in water, then in acetone and was dried in an oven. Two such endcaps, prepared as described, were required to seal alumina envelope 5. Envelope 5 was made of recrystallized alumina and was translucent. The length and diameter of envelope 5 were 3¾ inches and 0.375 inch respectively.

To seal endcap 1 to the end of envelope 5, six washers, measuring 0.375 inch outside diameter by 0.310 inch inside diameter by 2 mils thick, were used. Two such zirconium washers were first placed within the large diameter end of endcap 1, followed by two vanadium and then two titanium washers. One end of envelope 5 was then also inserted to abut the titanium washers. The opposite end of envelope 5 was similarly closed and the entire asembly was then placed into a molybdenum clamping device. The purpose of the device was to exert sufficient pressure on the endcaps against the ends of the envelope during the sealing operation to obtain a satisfactory seal as the wafers fused them together. Sealing of the endcaps to the envelope was effected by heating the entire assembly to 1400° C. in an argon atmosphere for four minutes.

After cooling and removal from the clamping device, one exhaust tube was pinched off, as previously described, to prepare the arc tube for exhausting, filling and sealing.

It is apparent that modifications and changes may be made within the spirit and scope of the instant invention. It is our intention, however, to be limited only by the appended claims.

We claim:

1. In the manufacture of an arc tube having a light-transmissive alumina envelope, the steps which comprise: connecting an exhaust tube to one end of a niobium endcap; assembling a tungsten electrode to said endcap, said electrode protruding in an opposite direction to said exhaust tube; cleaning the endcap assembly with a hot aqueous solution of hydrogen peroxide; rinsing said assembly with water; and sealing the end of said envelope to said endcap assembly.

2. The process according to claim 1 comprising the additional steps of first deep drawing said endcap from flat stock into a tri-sectional cylindrical shape and solvent cleaning said endcap.

3. The process according to claim 1 wherein said cleaning includes the step of immersing said endcap assembly into said hot solution of aqueous hydrogen peroxide.

4. The process according to claim 3 wherein the temperature of said solution is between about 30° and 80° C.

References Cited

UNITED STATES PATENTS 2,680,236   6/1954   Kuebler _____ 29—25.13 X

WILLIAM I. BROOKS, Primary Examiner

U.S. Cl. X.R.

29—25.13; 313—108, 311